United States Patent [19]

Douglas et al.

[11] Patent Number: 5,491,784
[45] Date of Patent: Feb. 13, 1996

[54] METHOD AND APPARATUS FOR FACILITATING INTEGRATION OF SOFTWARE OBJECTS BETWEEN WORKSPACES IN A DATA PROCESSING SYSTEM GRAPHICAL USER INTERFACE

[75] Inventors: Thomas B. Douglas, Dallas; Robert J. Torres, Colleyville, both of Tex.

[73] Assignee: International Business Machines Corporation, Armonk, N.Y.

[21] Appl. No.: 175,998

[22] Filed: Dec. 30, 1993

[51] Int. Cl.$^6$ ................................................. G06F 15/00
[52] U.S. Cl. ................................................. 395/159
[58] Field of Search ........................... 395/155–161

[56] References Cited

PUBLICATIONS

IBM Technical Disclosure Bulletin, Desktop Object Grasping Package Display Pointer vol. 36 No. 03, Mar. 1993, pp. 107–109.
IBM Technical Disclosure Bulletin, Combined Cut (or Copy) and Paste Functions via Menus in a GUI, vol. 35 No. 6, Nov. 1992, pp. 455–456.
Research Disclosure RD312044, Direct manipulation ICON–pointer and interaction–enhances visual feedback about valid drap operations and during drag only pointer and collection icon move to target location, Havant, GB, No. 32, Apr. 1990, p. 1 of 1.

Richter, "Drop Everything: How to Make Your Application Accept and Source Drag–and–Drop Files", *Microsoft Systems Journal*, May/Jun. 1992, pp. 19–30.
Anonymous, "Drag and drop available target indicator", RD 34144, Research Disclosure, Sep. 1992, p. 711.
*Macintosh Reference*, Apple Computer, Inc., pp. 142, 150, 151, 209, 246–263, Mar. 1990.

*Primary Examiner*—Heather R. Herndon
*Assistant Examiner*—Joseph R. Burwell
*Attorney, Agent, or Firm*—Jonathan E. Jobe, Jr.; Melvin A. Hunn; Andrew J. Dillon

[57] ABSTRACT

A method and apparatus is provided for facilitating operator initiated integration of items between software objects in a graphical user interface. In this technique, the operator selects a source software object and one or more target software objects. The source software object and the target software objects include data items which may be copied by the operator between the software objects during an accelerated integration mode of operation. During the accelerated integration mode of operation, a graphical pointing device is utilized by the operator to select items which are present in the source software object. By manipulating the graphical pointing device, the operator selects items from the source software object for automatic inclusion in the one or more target software objects, while the graphical pointing device is maintained entirely within the source software object. A visual indication is automatically provided which is representative of the step of automatically copying.

33 Claims, 15 Drawing Sheets

METHOD AND APPARATUS FOR FACILITATING INTEGRATION OF SOFTWARE OBJECTS BETWEEN WORKSPACES IN A DATA PROCESSING SYSTEM GRAPHICAL USER INTERFACE

BACKGROUND OF THE INVENTION

1. Technical Field

The present invention relates in general to graphical user interfaces for data processing systems, and in particular to techniques which facilitate interaction between software objects in a graphical user interface.

2. Description of the Related Art

Graphical user interfaces are now widely utilized in software to facilitate control over an ever-expanding set of software objects which are to be manipulated and controlled. These software objects include operating system programs, application programs such as word processing programs, spread sheets, and personal information managers, but also include a variety of databases as well as libraries of archived documents.

One principle advantage of graphical user interfaces is that they allow operators to perform tasks on a large variety of software objects, notwithstanding the fact that the operators may have infrequent occasion to use all the software objects. This is true because most graphical user interfaces are designed with ease of use as the predominant design criteria. To the maximum extent possible, graphical user interfaces will utilize symbology and command structures which are consistent with an operator's intuition; that is: to the maximum extent possible graphical user interfaces provide a mirror-image of the real world. This is a significant advantage since programs can be learned quickly and with little effort.

One significant disadvantage of the utilization of graphical user interfaces is that many operations which are performed are slowed down significantly by the requirement that a graphical pointing device be manipulated in a manner which interacts with menus, buttons, and iconographic representations of software objects. Graphical user interface operations such as "pointing and clicking" and "dragging and dropping" necessarily require a greater amount of time than that required of interfaces which are predominantly activated through utilization of the data processing system keyboard.

It is now one industry-wide objective to maintain the advantageous "intuitive" nature of graphical user interfaces while allowing for increased speed in performing common or routine tasks within the graphical user interface.

At the present time, it is common to provide "clipboards" in graphical user interfaces which facilitate the copying of software objects and data items from one software object to another. A clipboard requires that the graphical pointing device be used to first copy the items from the source software object to the clipboard, and then copy the items from the clipboard to the target software object. This requires multiple point-and-click and drag-and-drop operations, which greatly hinder the operator in particularly large copying operations.

SUMMARY OF THE INVENTION

It is one objective of the present invention to provide a method and apparatus which facilitates operator integration of items between software objects which, once enabled, allows for the automatic copying of items from a source object to one or more target objects, while simultaneously providing a visual indication which is representative of the automatic copying.

It is another objective of the present invention to provide a method and apparatus which facilitates operator integration of items between software objects, which allows items from a source software object to be automatically copied to one or more target software objects, while a graphical pointing device is maintained within the source software object.

It is yet another objective of the present invention to provide a method and apparatus which facilitates operator initiated integration of items between software objects in a graphical user interface which allows the utilization of a conventional graphical pointing device to perform operations in an accelerated integration mode of operation during which items from a source software object are automatically copied to one or more target software objects, while a dynamic representation of the copying action is provided in the graphical user interface.

These and other objectives are achieved as is now described. When characterized as a method, the present invention includes a number of method steps. A visual representation is provided in a graphical user interface which is representative of an accelerated integration mode of operation, which may be selected by the operator. The data processing system continuously monitors operator input for selection of the visual representation of the accelerated integration mode of operation, and then enables the accelerated integration mode of operation in response to a detected operator input. During the accelerated integration mode of operation, the data processing system monitors operator input for selection of a source object and at least one target object. (Alternatively, the computer may be programmed to automatically identify the source software object from the context provided by the previous operator-initiated actions). Then, the data processing system monitors operator input from a graphical pointing device for selection of items present in the source object. Finally, the data processing system automatically (1) copies the selected items to the one or more target objects, and (2) provides a dynamic representation in the graphical user interface of each step of copying, while the graphical pointing device is maintained within the source object. Thereafter, operator input is monitored for selection of deactivation of the accelerated integration mode of operation, and the accelerated integration mode of operation is deactivated in response to a selected operator input.

When characterized as an apparatus, the present invention is directed to a means in a data processing system graphical user interface which facilitates operator integration of items between software objects, and includes a number of elements which cooperate together. A means is provided for allowing operator selection of a source software object and a target software object. Means is provided for recording the operator selection. Means is also provided for monitoring operator input from a graphical pointing device for selection of items present in the source software object. Means is provided for automatically copying items selected by the operator to the target object, while the graphical pointing device is maintained within the source software object. Finally, means is provided for automatically providing a visual indication representative of the automatic copying.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
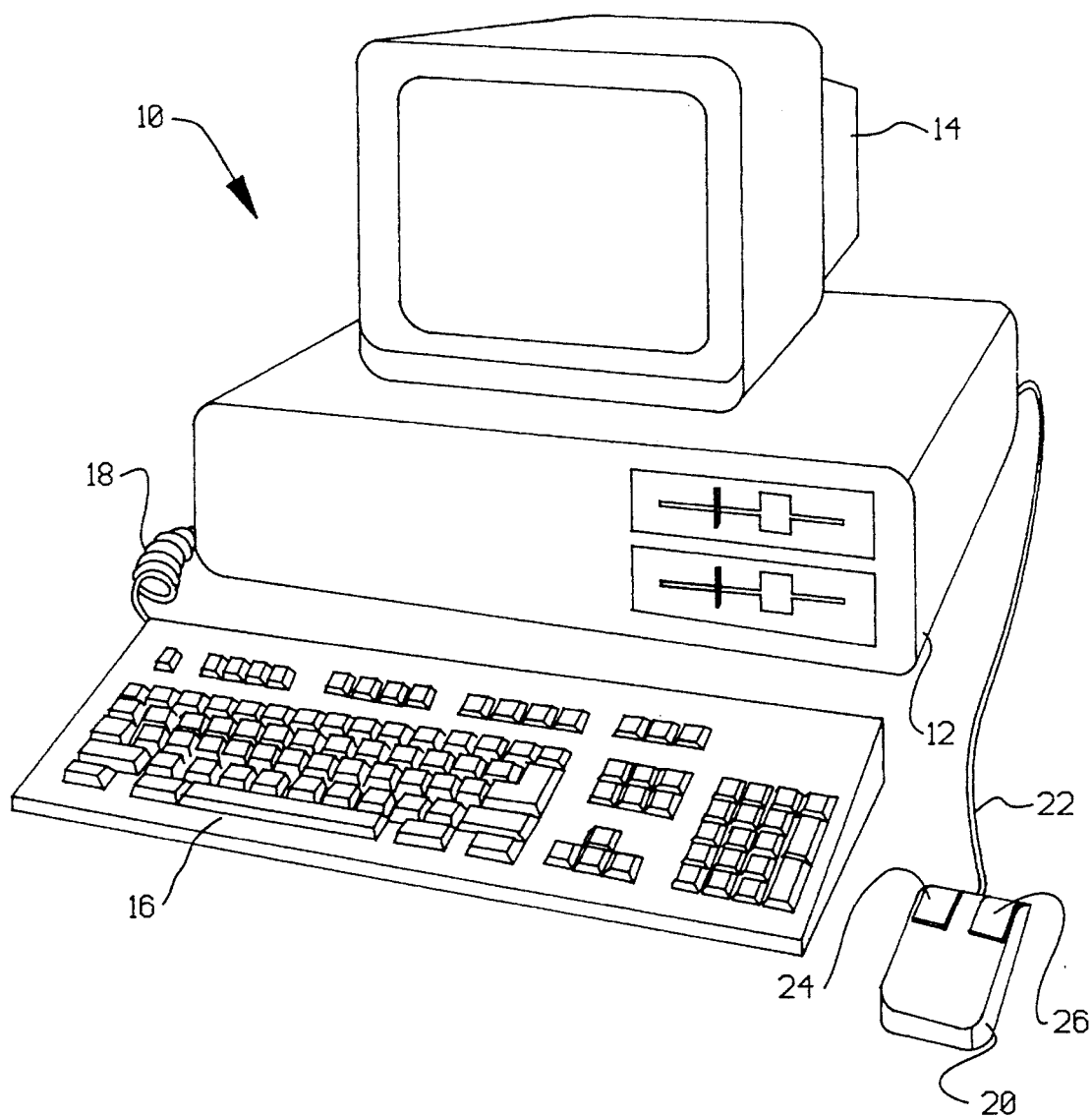
FIG. 1 is a pictorial representation of a data processing system which may be programmed in accordance with the present invention.

With reference now to the figures and in particular with reference to FIG. 1, there is depicted a pictorial representation of data processing system 10 which may be programmed in accordance with the present invention. As may be seen, data processing system 10 includes processor 12 which preferably includes a graphics processor, memory device and central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24 and right button 26, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a so-called personal computer, such as the Model 80 PS/2 computer manufactured by International Business Machines Corporation of Armonk, New York.

Figure 2:
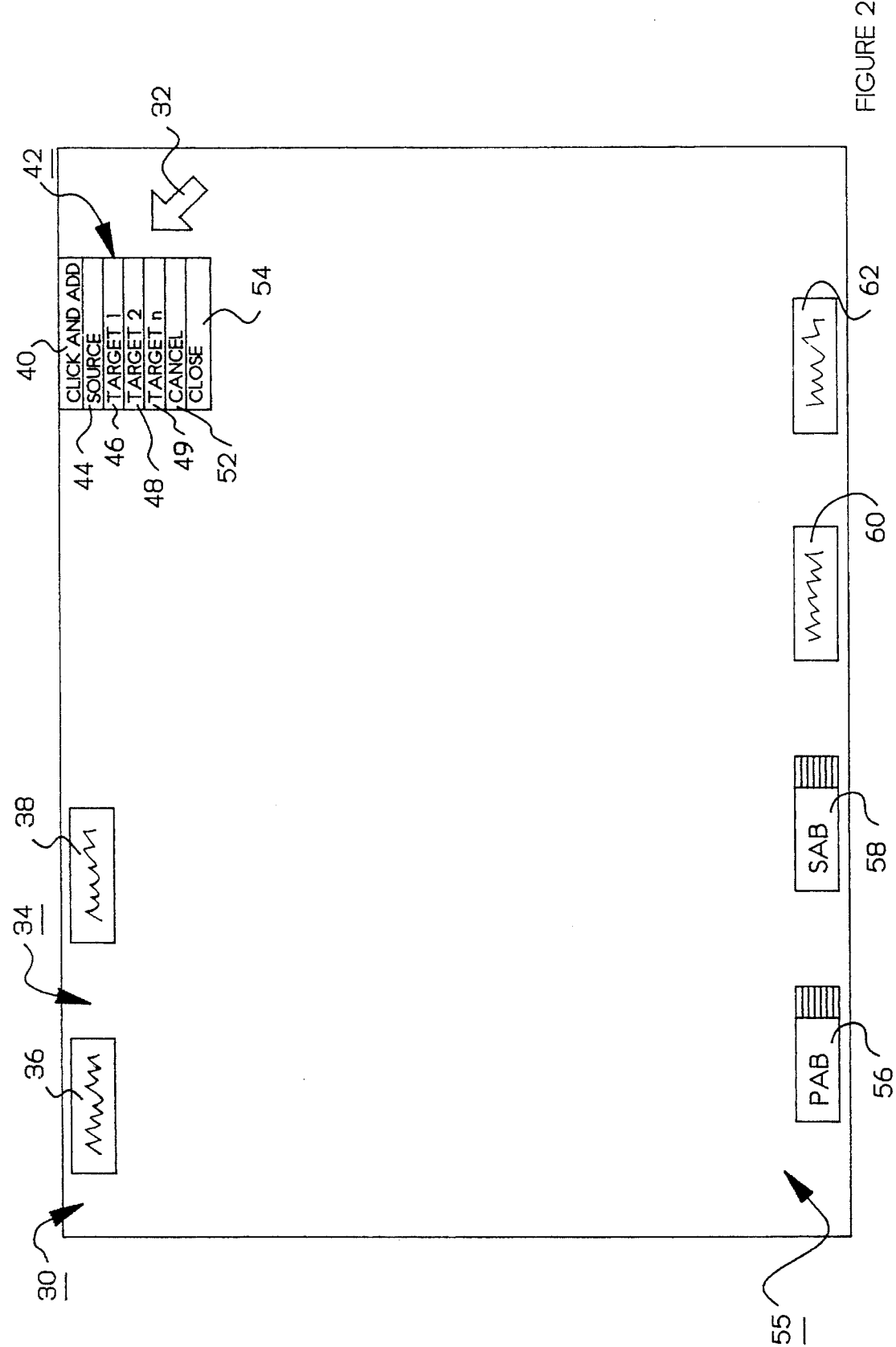
FIGS. 2, 3, and 4 are pictorial representations of display screens in a graphical user interface which include the technique for facilitating integration of software objects in accordance with the present invention, and in particular depict the enablement of an accelerated integration mode of operation, and selection of a source software object and a target software object.

FIG. 2 is a depiction of display screen 30 of video display 14 of data processing system 10. Display screen 30 includes cursor 32 which is moved about display screen 30 through operation of graphical pointing device 20. Display screen 30 also includes software buttons 34, including button 36, and button 38 (which represent conventional software buttons), and click and add button 40. Cursor 32 may be utilized to select a function represented by buttons 34. In the preferred embodiment of the present invention, cursor 32 may be utilized to select the click and add button 40, which results in the display of pull-down menu 42. As is shown in FIG. 2, pull-down menu 42 includes "source" menu item 44, "target 1" menu item 46, "target 2" menu item 48, "target n" menu item 49, "cancel" menu item 52, and "close" menu item 54.

As is also shown in FIG. 2, a plurality of icons 55 are disposed along the lowermost portion of display screen 30, and include personal address book icon 56, shared address book icon 58, icon 60 and icon 62 (which represent conventional icons). As is conventional, cursor 32 may be positioned through actuation of graphical pointing device 20 to overlie a particular one of icons 55 to select or "open" the document which is represented by the particular one of icons 55 during a "point and click" operation.

In the preferred embodiment of the present invention, an accelerated integration mode of operation is selected by the operator through utilization of cursor 32 to select "click and add" button 40 in a "point and click" operation. This causes pull-down menu 42 to be displayed. Cursor 32 is then utilized to identify particular software objects which are represented by icons 55 as source software objects and target software objects for the accelerated integration mode of operation.

Figure 3:
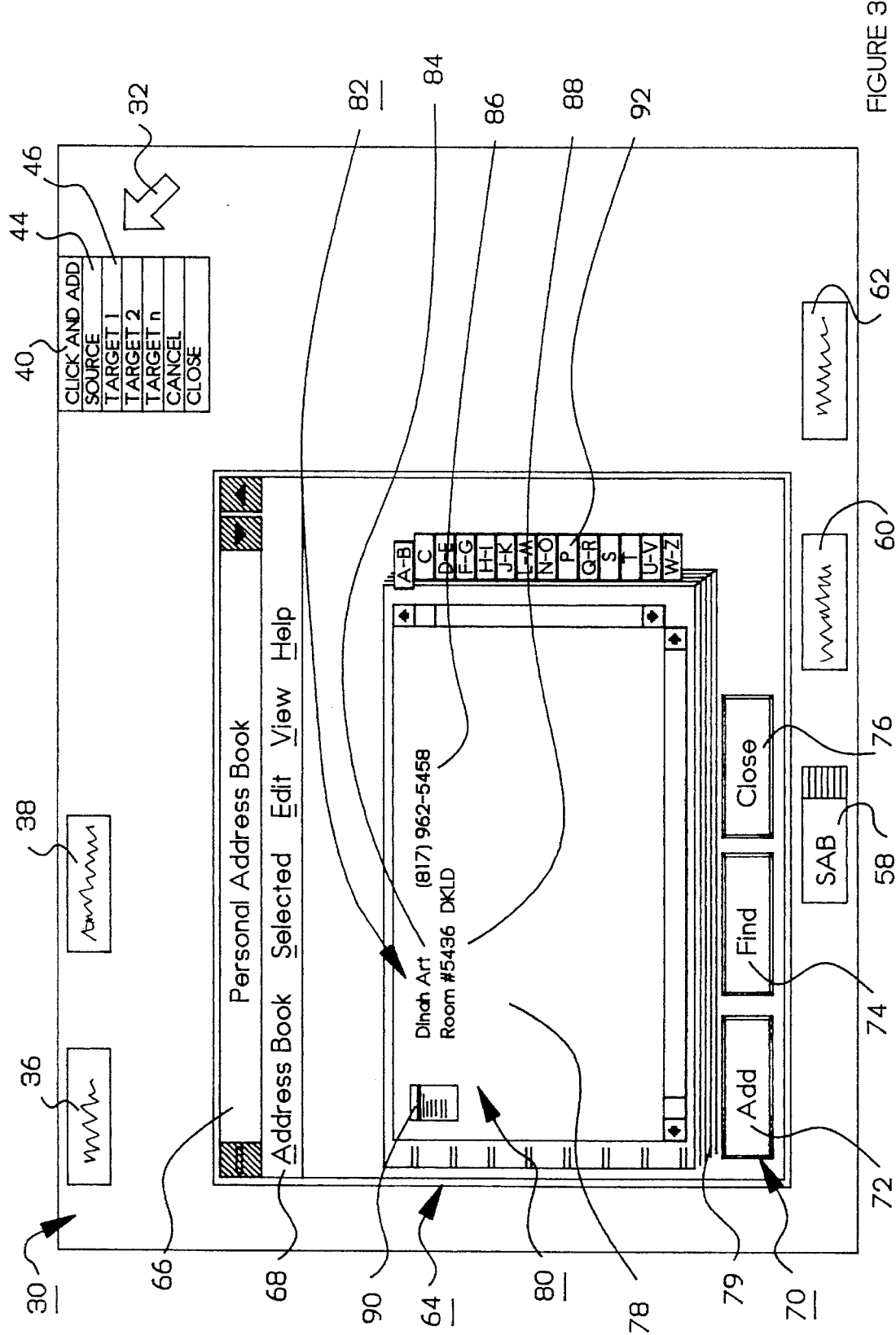

For example, cursor 32 may be placed over "target 1" menu item 46, and "clicked" to select that menu item. Thereafter, cursor 32 may be moved about display screen to a particular one of icons 55, such as personal address book icon 56. Cursor 32 may be placed over personal address book icon 56, and "clicked" to identify the personal address book document which is visually represented by personal address book icon 56 as a "target" of data items during the accelerated integration mode of operation. In response to the identification of personal address book icon 56 as a target in the accelerated integration mode of operation, data processing system 10 will automatically "open" the document represented by personal address book icon 56. This operation is depicted in FIG. 3, wherein personal address book viewport 64 is displayed in an "open" condition.

In an alternative embodiment, the "target" of the data items can be determined through a computer-implemented analysis of either (1) the software objects which are open and active within display screen 30, or (2) the operator interaction with software objects through utilization of either the graphical pointing device 32 or keyboard 16. In this alternative approach, the "context" of the selection of the "click and add" button 40 can determine which particular item is to be the "target" of data items. In this alternative technique, the operator need not utilize graphical pointing device 32 to select the "target 1" menu item 46; instead, upon selection of the "click and add" button 40, data processing system 10 automatically analyzes either the items which are present and open within the graphical user interface, or the prior operator activity, to automatically identify the "target".

In the preferred embodiment of the present invention, the target object should be highlighted or accentuated to emphasize to the operator that it has been identified as the target item. This can be accomplished by displaying the object in a different color, a different grayscale value, or as a flashing object. This is especially useful when a plurality of workspaces are provided in overlapping relation within the graphical user interface. As is shown in FIG. 3, personal address book viewport includes title bar 66 which identifies the document as a "personal address book", but also includes menu bar 68 which includes a number of user-selectable commands, and buttons 70 (including add button 72, find button 74, and close button 76) which can be manipulated or actuated through utilization of cursor 32 during a "point and click" operation to perform the functions of adding data items to the personal address book, finding a particular data item in the personal address book, or closing the personal address book. As is shown in FIG. 3, personal address book viewport 64 further includes a visual representation of a page 78 from a physical address book. Personal address book viewport 64 further includes a simulation of stacking 79 as well as tab portion 92 which includes alphabetical tabs.

The operator may navigate through the personal address book by moving cursor 32 to a particular alphabetic tab, and then performing a "clicking" operation to turn the address book to that page. In response to the operator selection, data processing system 10 will immediately display a simulation of a page with data on it which corresponds to the alphabetic tab. For example, operator selection of the "S" tab will display an address book page which includes entries which identify individuals which have last names which begin with the letter "S". In the view of FIG. 3, only one data item 80 is displayed. This data item includes a plurality of data fields 82, including name field 84, telephone number field 86, and building address field 88. Data item 80 further includes icon 90 which provides a visual representation of the information contained in the data fields.

Next, the operator may utilize cursor 32 to select a source software object which includes a plurality of items which are to be integrated with the target object. For purposes of this patent, the term "integration" is intended to comprehend "copying" operations, "moving" operations, or any other activity which transfers data between software objects. With reference to FIG. 3, cursor 32 may be moved onto the "source" menu item 44, and then actuated to select this menu item from pull-down menu 42. Then, cursor 32 is utilized to identify the source software object. In the example of FIG. 3, cursor 32 may be moved across display screen 30 to overlie shared address book icon 58, which is representative of an address book document. Graphical pointing device 20 may be "clicked" to select shared address book icon 58 and identify it as the "source" software object. Preferably, once the source software object is selected, the document which it represents is opened within display screen 30, as is depicted in FIG. 4.

As is shown, shared address book viewport 94 is displayed on display screen 30 in overlapping relationship with personal address book viewport 64. Shared address book viewport 94 includes title bar 96 which identifies the document as a "shared address book", and a menu bar 98 which identifies a plurality of operations which can be selected by the operator. Shared address book viewport 94 further includes software buttons 100, including find button 102, close button 104, and help button 106, which may be utilized to initiate "find" operations, "close" operations, or "help" operations. Shared address book viewport 94 includes page 108 which simulates a page in a physical address book. Shared address book viewport 94 includes tab portion which includes alphabetic tabs of the type which are utilized in address books. The operator may utilize cursor 32 to perform "point and click" operations on tab portion 135 to select particular pages from the address book document which is displayed in shared address book viewport 94.

Figure 4:
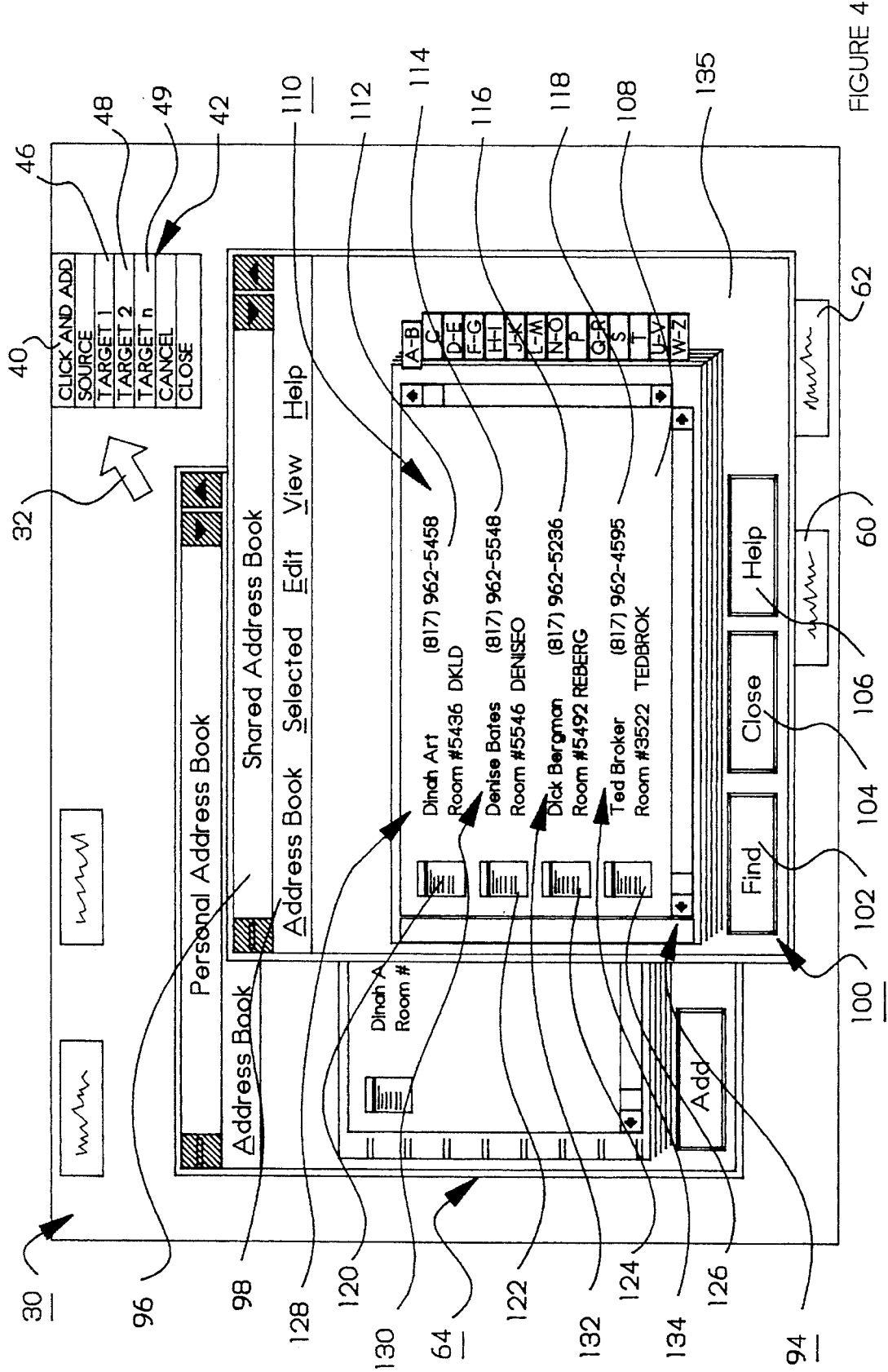

In the view of FIG. 4, the page containing listing of individuals having last names beginning with the letter "A" or "B" is displayed. As is shown, this page includes a plurality of data items 110, with each data item representing an entry in the shared address book. Data item 112 identifies "Dinah Art", and includes a plurality of data fields 128 for name, telephone number, building address, and network identification, as well as icon 120 which is representative of the entry. Data items 110 further includes data item 114 which identifies "Denise Bates", and includes a number of data fields 130 for name, telephone number, building address, and network identification, as well as icon 122 which is representative of the entry. Data item 110 further includes data item 116 which identifies "Dick Bergman" and includes data fields 132 such as address field, telephone number field, building address field, and network identification, but also includes icon 124 which represents this entry. Finally, data items 110 includes data item 118 which identifies "Ted Broker", and includes data fields 134 such as name field, a telephone number field, a building address, and a network identification, as well as icon 126 which is representative of this entry.

In the preferred embodiment of the present invention, pull-down menu 42 includes a "target 1" menu item 46, a "target 2" menu item 48, and a "target n" menu item 49. This allows the operator to select one, two, or a greater number of target objects for receipt of items from a source object. If the operator selects the "target n" menu item 49, the keyboard may be utilized to type a number in the space provided on the "target n" menu item which identifies the total number of targets which will be selected by the operator. The operator may then utilize cursor 32 to select three, four, five or more target items which are to receive simultaneously objects from the source software object during the accelerated integration mode of operation. For example, the operator may utilize cursor 32 to select icons 60, 62 for identification as "software targets" for simultaneous receipt of items from a software source object, which is identified in the next stage. If icons 60 and 62 are selected during this process, they would be opened and displayed within display screen 30.

Figure 5:
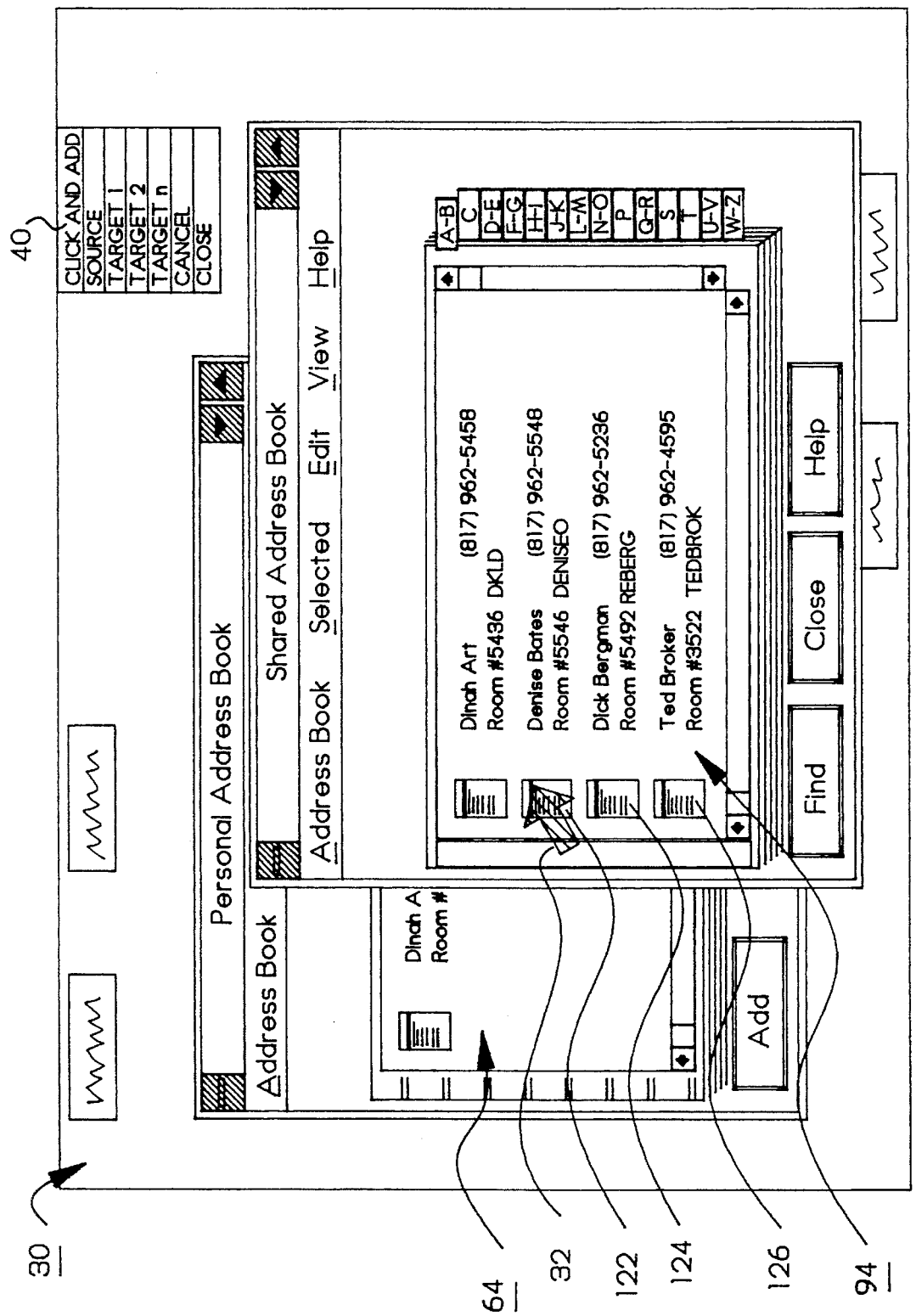
FIGS. 5, 6, 7, and 8 are pictorial representations of display screens, which illustrate utilization of the method and apparatus for facilitating integration of software objects in accordance with the present invention, for the software objects depicted in FIGS. 3 and 4.

FIGS. 3 and 4 depict the opening of a target software object and a source software object. FIGS. 5, 6, 7, and 8 will now be utilized to depict the accelerated integration mode of operation, during which items in the source software object are rapidly integrated (in this example, copied) to the one or more target software objects in response to operator manipulation of the graphical pointing device 20, while maintaining the graphical pointing device 20 entirely within the source software object. Turning first to FIG. 5, after the source and target software objects have been identified through utilization of cursor 32 and pull-down menu 42, cursor 32 is altered in a manner which emphasizes its capacity for implementing the accelerated integration mode of operation. In the example of FIGS. 5 through 8, the cursor is shown as having cross-hatching on it. In alternative embodiments, the cursor can take a different shape, be displayed in a different color, or grayscale, or be displayed in a different size. Any of these alternatives is acceptable, provided cursor 32 is sufficiently modified to communicate to the operator that it is now capable of performing the accelerated integration operation. In brief overview, cursor 32 will be maintained entirely within the source software object (in this example, shared address viewport 94) and will be utilized to select one or more items which are displayed within the source software object for automatic and rapid copying to the one or more target software objects which have been previously identified by the operator.

Figure 6:
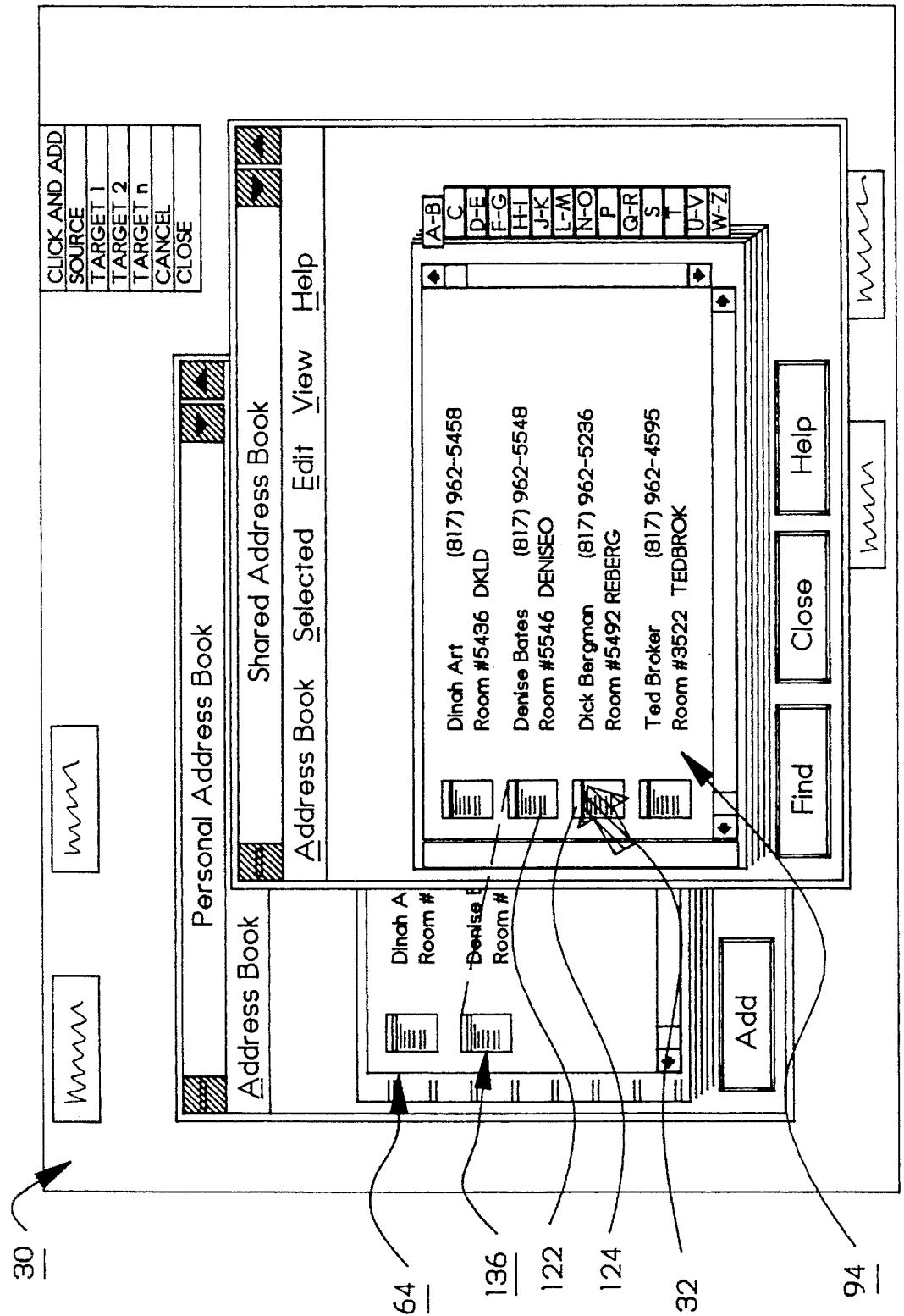

FIG. 5 shows the placement of cursor 32 over icon 122 which is representative of the data in the data fields which identifies "Denise Bates". The operator need only actuate graphical pointing device 20 by "clicking" it. This initiates the display of a simulated "drag-and-drop" operation which involves icon 122, and which simulates a drag-and-drop operation from shared address book viewport 94 to personal address book viewport 64, while cursor 32 remains fully within shared address book viewport 94. That the drag-and-drop operation is a "simulation" can be communicated to the operator by displaying the simulated drag-and-drop operation in a different color, or grayscale, than would ordinarily be seen within the graphical user interface being utilized. More specifically, a very light grayscale value may be utilized to simulate the drag-and-drop operation which makes the operation appear to occur in "phantom". In accordance with the present invention, the simulated drag-and-drop operation is displayed at an accelerated pace, far faster than would it normally occur within the graphical user interface. This too communicates to the operator that the drag-and-drop operation is merely a "simulation". This visual representation of a drag-and-drop operation 136 is depicted in FIG. 6. At the termination of the drag-and-drop operation, icon 122, and the associated data fields, are automatically copied to the target software object (in this case, personal address book viewport 64) and are displayed.

As is depicted in FIG. 6, the operator may then move cursor 32 to another item or object within the source software object of shared address book 94, such as icon 124, which is representative of the entry for "Dick Bergman". Actuation of the graphical pointing device 20 by "clicking" will automatically copy both icon 124 and the associated textual data fields from shared address book viewport 94 to personal address book viewport 64, without additional operator intervention, and while cursor 32 remains entirely within shared address book viewport 94. Like the previous operation, a visual representation of a drag-and-drop operation 138 will be displayed within display screen 30 to inform the operator that the automatic copying to the target software object has occurred. As in the previous copying operation, a visual representation of a drag-and-drop operation 138 is displayed in a manner which is distinctly different from ordinary drag-and-drop operations, and at a greatly accelerated pace. Both the mode of display and the pace of display emphasize to the operator that the functional equivalent of a drag-and-drop operation has occurred.

Figure 7:
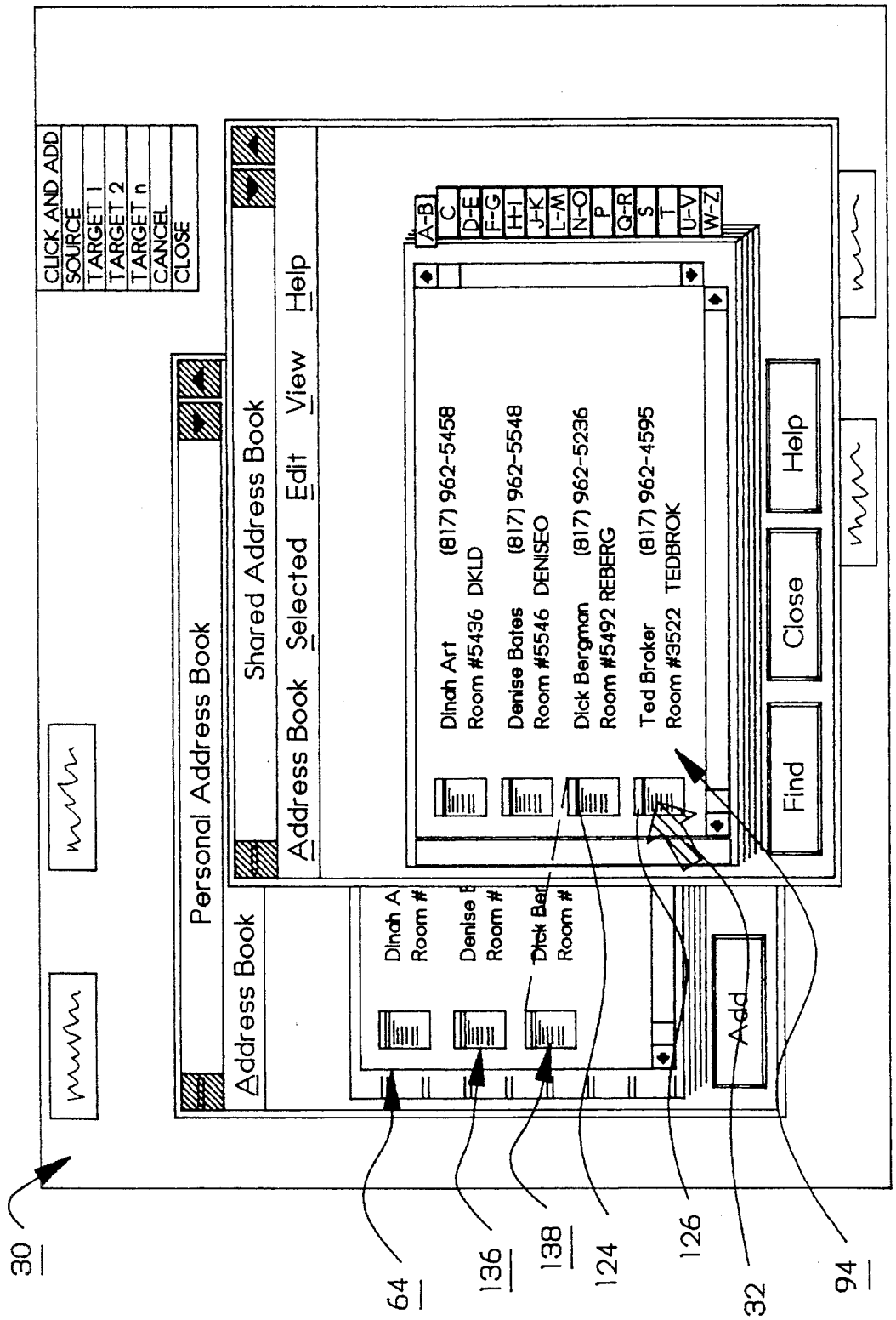
Figure 8:
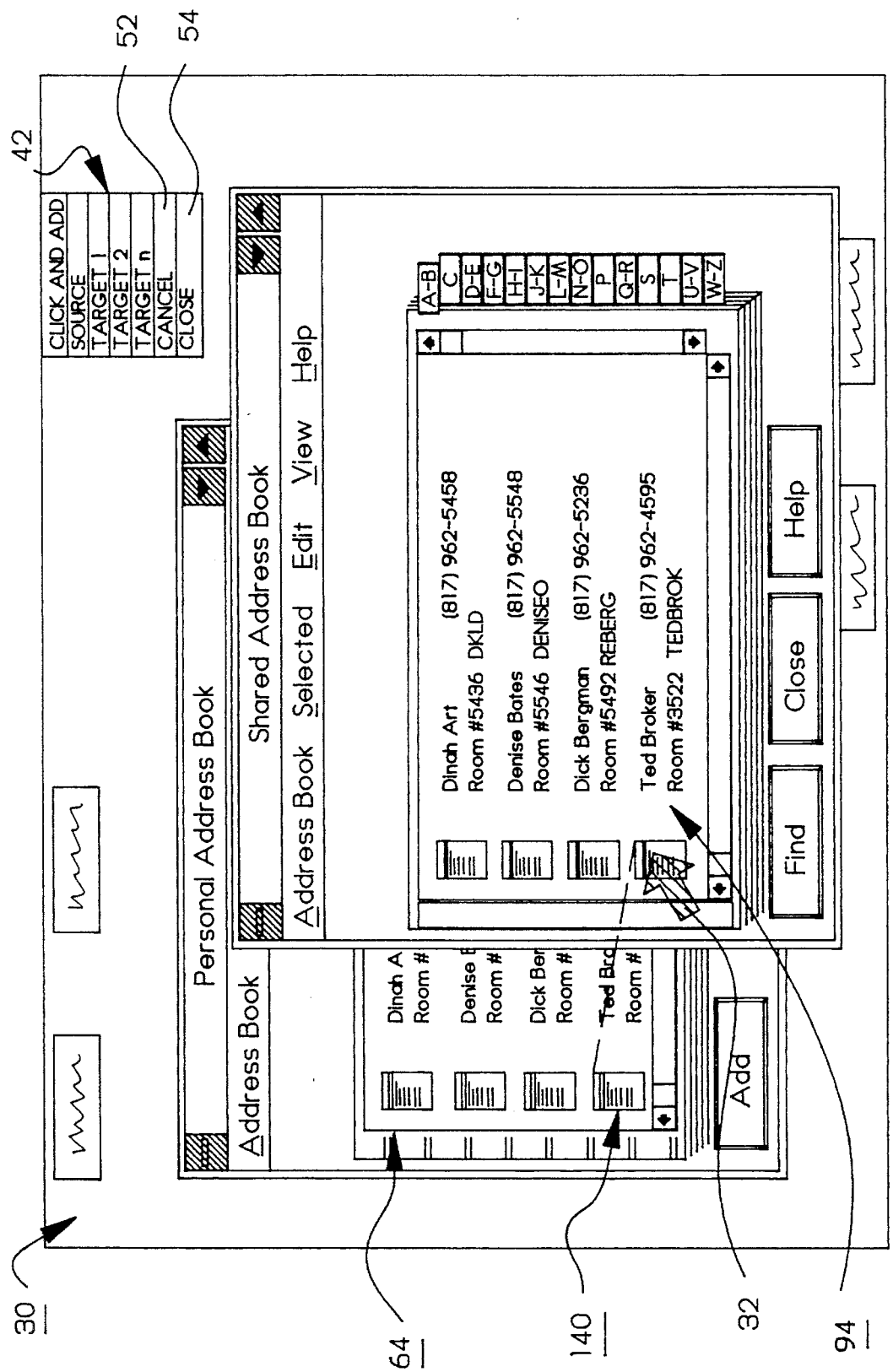

Continuing with FIG. 7, cursor 32 may be placed upon icon 126 which is representative of the data fields which identify an entry for "Ted Broker". Manipulation of the graphical pointing device 20 will cause icon 124 and associated data fields to be copied to the one or more target software objects which have been previously identified by the operator. Additionally, as is shown in FIG. 8, a visual representation of a drag-and-drop operation 140 will be displayed within display screen 30. This visual representation will differ from the ordinary representation of drag-and-drop operations within the graphical user interface, and will occur at a greatly accelerated pace, as before, to emphasize to the operator that the copying operation has occurred in response to the operator manipulation of the graphical pointing device 20.

Pull-down menu 42 includes "cancel" menu item 50 which is selected by the operator to cancel all operator initiated copying operations which have occurred since the identification of the source software object and the one or more target software objects. This allows the operator to rapidly undo any such copying operations which the operator now feels is undesired. In essence, utilization of the "cancel" menu item 50 returns all software objects to their original condition before the accelerated integration mode of operation was selected for use by the operator. Additionally, pull-down menu 42 includes a "close" menu item 54 which may be selected by the operator through utilization of graphical pointing device 20 to close the session of the accelerated integration mode of operation. Selection of this menu item disables cursor 32 from its ability to initiate accelerated integration operations, and releases the various software objects from their status as "source software objects" or "target software objects". In essence, the session is terminated, but the integration operations which have initiated by the operator have permanently altered the various software objects in accordance with the operator's commands.

Figure 9:
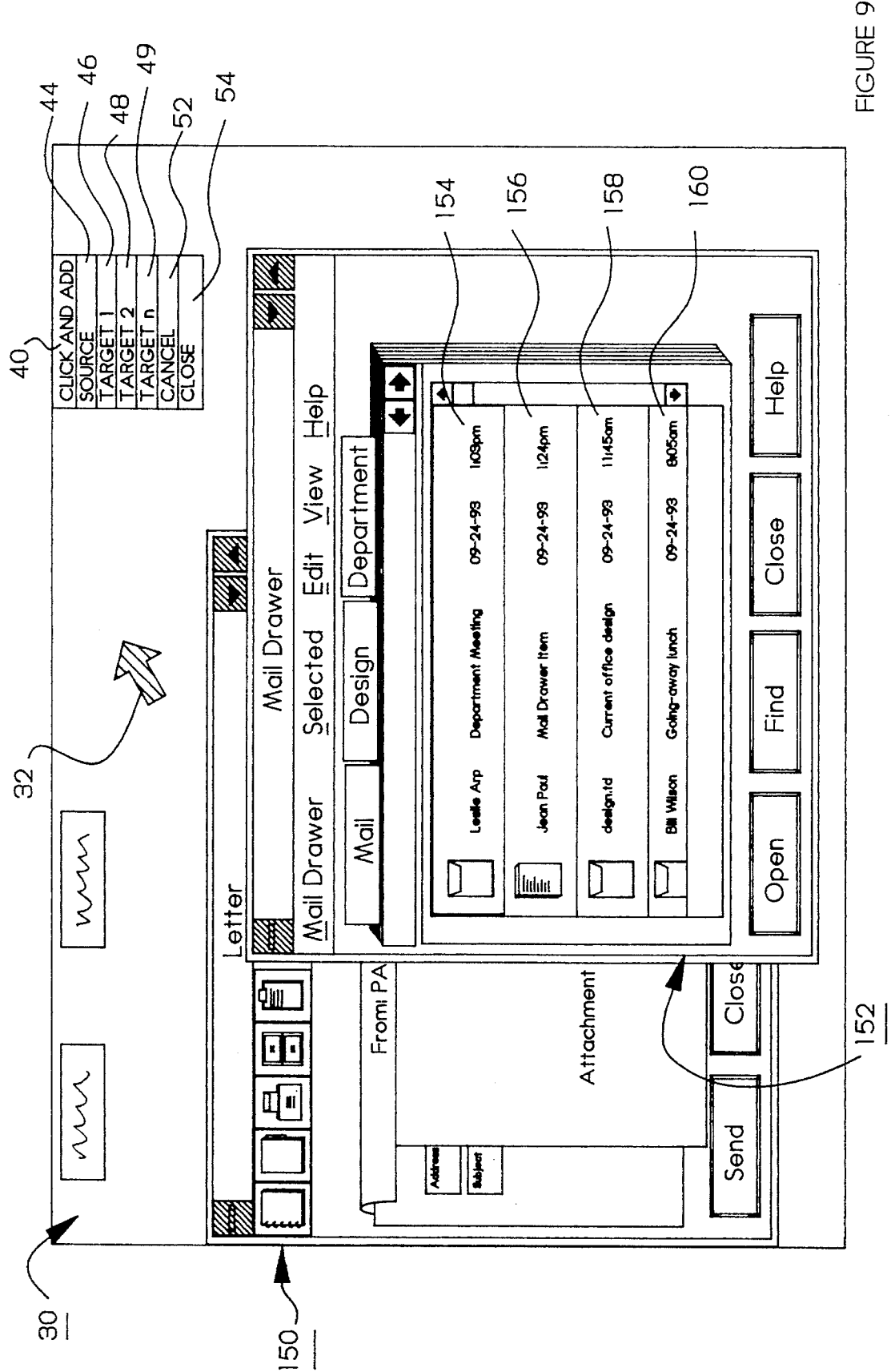
FIG. 9 is a pictorial representation of a display screen in a graphical user interface which utilizes the method and apparatus for facilitating integration of software objects in accordance with the present invention, and in particular illustrates an alternative use of the present invention.
Figure 10:
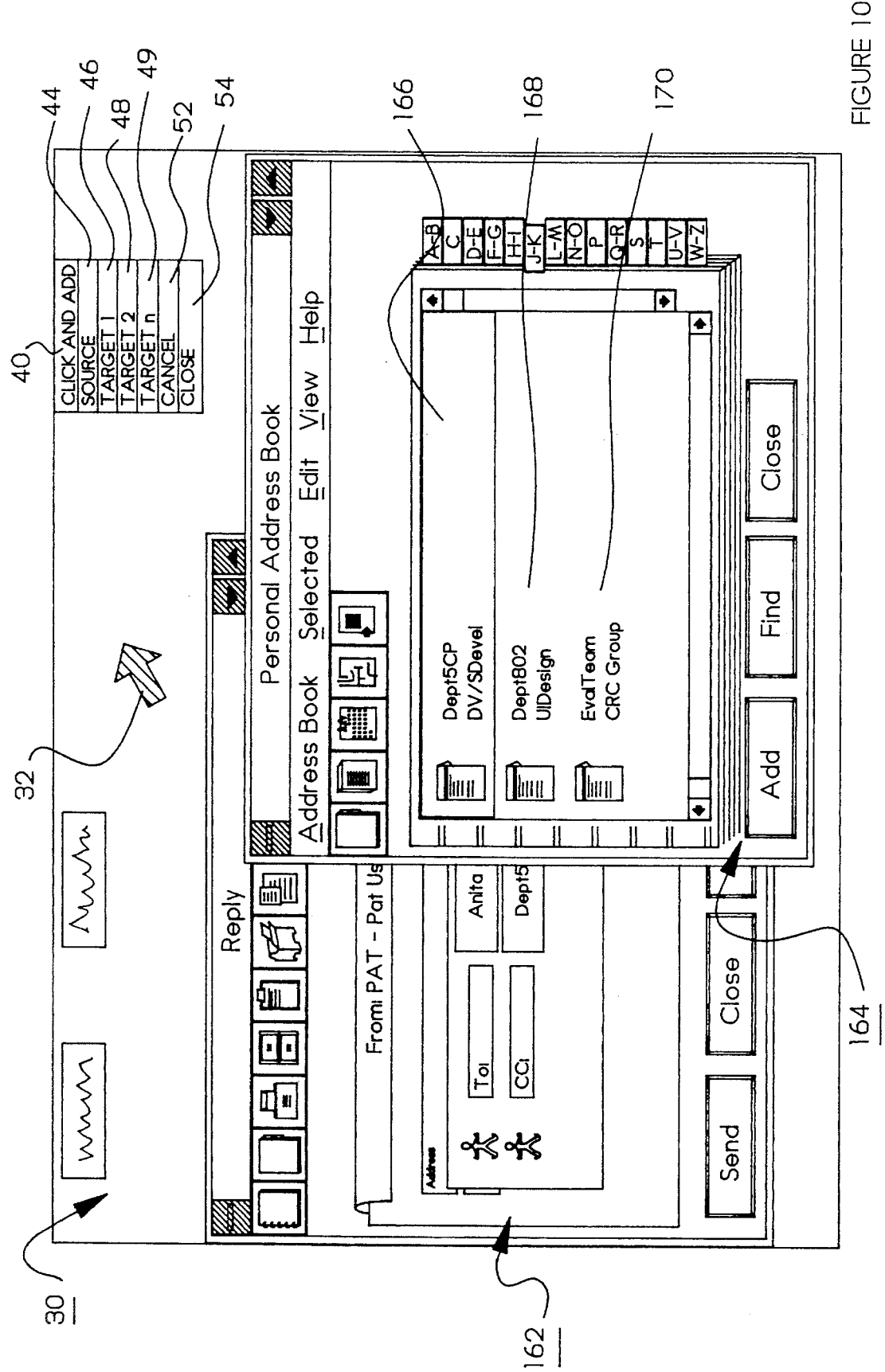
FIG. 10 is a pictorial representation of a display screen in a graphical user interface which is equipped with the method and apparatus for facilitating integration of software objects in accordance with the present invention, and in particular illustrates another utilization of the present invention.

The example of FIGS. 3 through 8 depicts the ease with which the present invention may be utilized to populate one directory-type object with items from another directory-type object. The present invention has many other useful applications, two of which are depicted in FIGS. 9 and 10. FIG. 9 depicts letter viewport 150 overlapped by maildrawer 152, with letter viewport 150 previously designated by the operator as the target software object and maildrawer viewport 152 previously identified by the operator as the source software object. As can be seen from FIG. 9, a letter has been typed, and the operator now desires to provide a plurality of attachments to the letter. By calling and opening the maildrawer viewport 152, the operator may utilize the accelerated integration mode of operation to transfer rapidly a plurality of previously created (and sent) mail items which are inventor led in the maildrawer viewport 152. Any or all of items 154, 156, 158, 160 may be selected by the operator through utilization of cursor 32 for rapid copying to the letter viewport 150 as attachment items to a letter which has already been created. As in the previous examples, cursor 132 is placed on the items selected by the operator, and the graphical pointing device 20 is "clicked". This causes: (1) the generation of a simulated "drag-and-drop" operation involving the iconographic representation of the item, in a display format which differs from typical drag-and-drop operations in the typical operations in the particular graphical user interface, and at a pace which is greatly accelerated, both of which emphasize to the operator that the accelerated integration operation is occurring, and (2) automatic copying of the item to the target software object, in this case the letter viewport 150.

FIG. 10 provides yet another example of another application of the present invention. In this figure, reply viewport 162 is displayed as being overlapped by personal address book viewport 164. Items 166, 168, and 170 are displayed in the view of FIG. 10 within personal address book viewport 164. Each item represents an entry which identifies work groups which are working on projects. The work group includes a plurality of individuals, but the personal address book identifies the group as a unit. In this particular example, the personal address book viewport 164 is the source software object, and items from this source software object will be automatically and rapidly copied to the reply viewport 162, which is the target software object in this example. In this example, the operator desires to copy one or more work groups with a reply to an E-mail communication. Cursor 32 may be placed over the icon which is representative of items 166, 168, 170 to select the group identified in the item for receipt of copies of the reply. Utilizing cursor 32 to "point and click" within the source software object will result in: (1) the automatic generation of a simulated drag-and-drop operation which is different from ordinary drag-and-drop operations by one or more display characteristics, but is displayed in a more rapid pace than that of an ordinary drag-and-drop operation, and (2) the particular items selected by the operator actuation of a graphical pointing device 20 will be automatically copied to the target software object, which is in this case is letter viewport 150.

Figure 11:
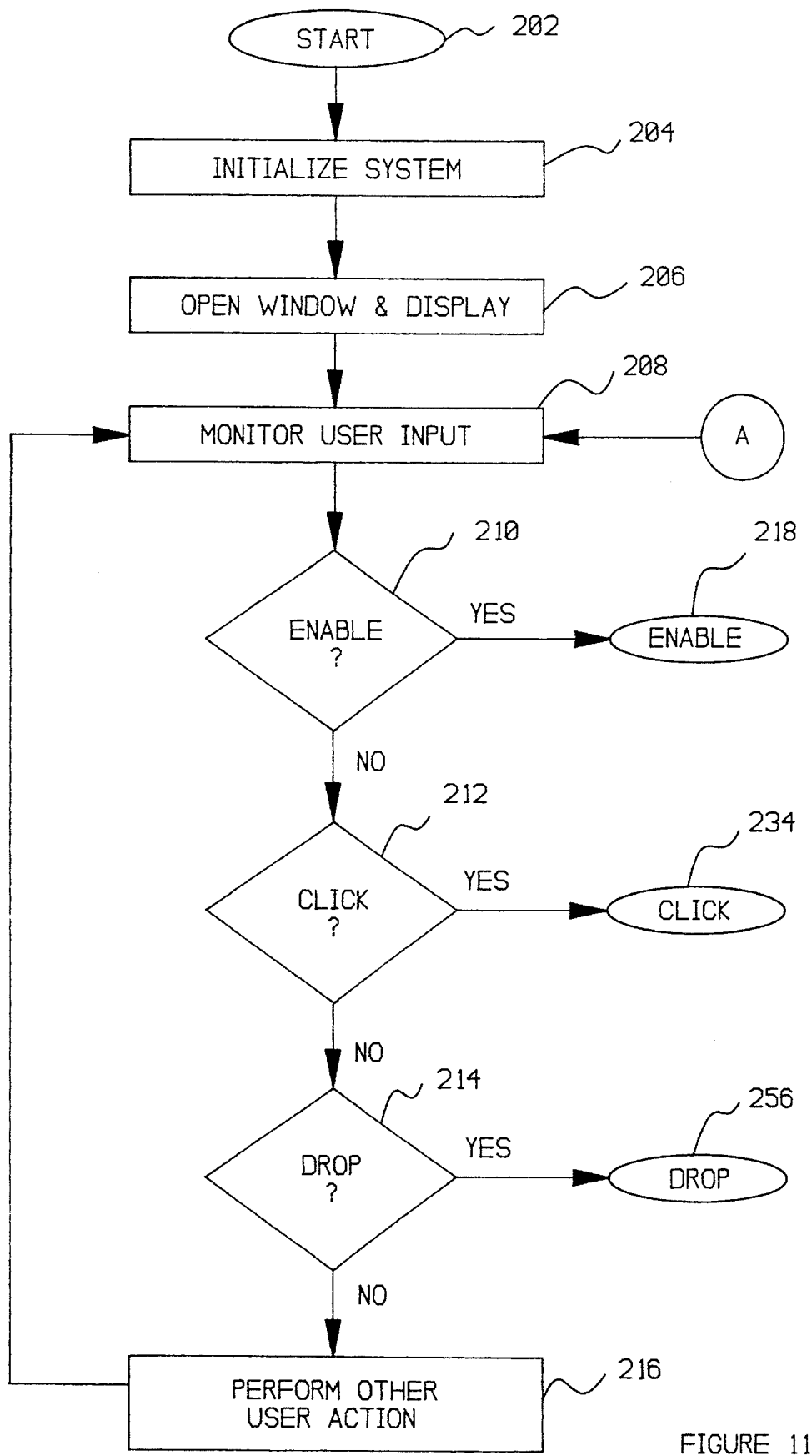
FIG. 11 is a flowchart representation of a broad overview of a preferred embodiment of the method and apparatus for facilitating integration of software objects.

FIG. 11 provides a broad overview of a computer program which implements the present invention. The process starts at software block 202, and continues at software blocks 204, and 206, wherein data processing system 10 is initialized and the window which contains click and add button 40 is displayed. In software block 208, data processing system 10 monitors for operator input, and in particular monitors for operator actuation of the click and add button 40. In response to operator selection of the click and add button 40, pull-down menu 42 is displayed. The process continues in three routines: (1) the enable routine 218, (2) the click routine 234, and (3) the drop routine 256, which are accessed by enable call 210, click call 212, and drop call 214. The calls 210, 212, 214 to the enable routine 218, click routine 234, and drop routine 256 are initiated by operator input. FIGS. 12, 13a and 13b, and 14 respectively depict the enable routine 218, the click routine 234 and the drop routine 256. Once these routines are completed, as is depicted in FIG. 11, the process continues at software block 216, wherein data processing system 10 performs other user actions, until the accelerated integration mode of operation is requested by the operator, and detected in software block 208.

Figure 12:
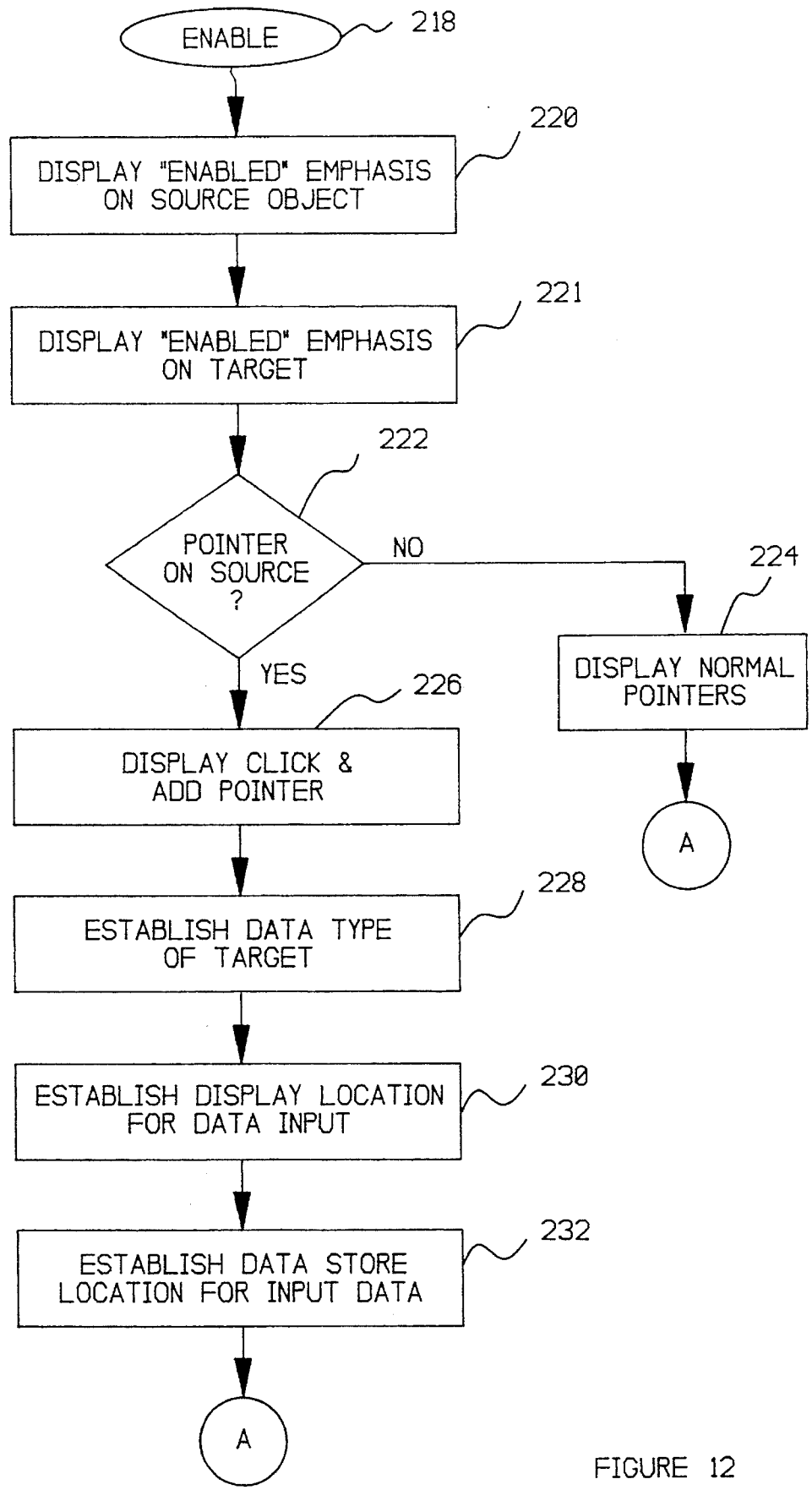
FIG. 12 a flowchart representation of the "enable" subroutine of FIG. 11.

With reference now to FIG. 12, the enable routine commences at software block 218, and continues by awaiting operator actuation of pull-down menu 42 to identify the source object and the target object, in software blocks 220, 221. After each operator selection, data processing system 10 automatically provides an "enabled" emphasis to these objects. As was discussed above, the status of a particular software object as a source software object, or target software object in the accelerated integration mode of operation can be depicted by utilization of color coding or grayscale coding of all, or a portion of, the software object, by flashing all, or a portion of, the target or source software object at particular rates, or by otherwise altering the viewport or iconographic representation of the viewport in a manner which clearly indicates to the operator that the accelerated integration mode of operation has been entered, and that these particular software objects have been selected for the purpose of implementing the accelerated integration mode of operation for particular items within the source object.

In accordance with software block 222, data processing system 10 continually monitors to determine if the graphical pointing device is on the source object. If not, in accordance with software block 224, a normal pointer is displayed. However, if the cursor 32 associated with graphical pointing device 20 is within the source software object, the cursor will be modified in a manner which indicates to the operator that any use of the cursor will result in rapid integration (in this example, copying) of particular items within the source software object to the one or more target software objects which have been identified. This feature is identified in software block 226, which requires that a special "click and add" pointer be provided in the visual display 30 to communicate this message clearly to the operator. As cursor 32 is moved about the source software object, data processing system 10 continuously notes the types of data which are present within the target software object, in accordance with software block 228. Then, in accordance with software block 230, data processing system 10 establishes display locations for insertion of copies of data items from the source software object, within the target software object. Then, in accordance with software block 232, data processing system 10 establishes a data store location for input data from the source software object.

Figure 13A:
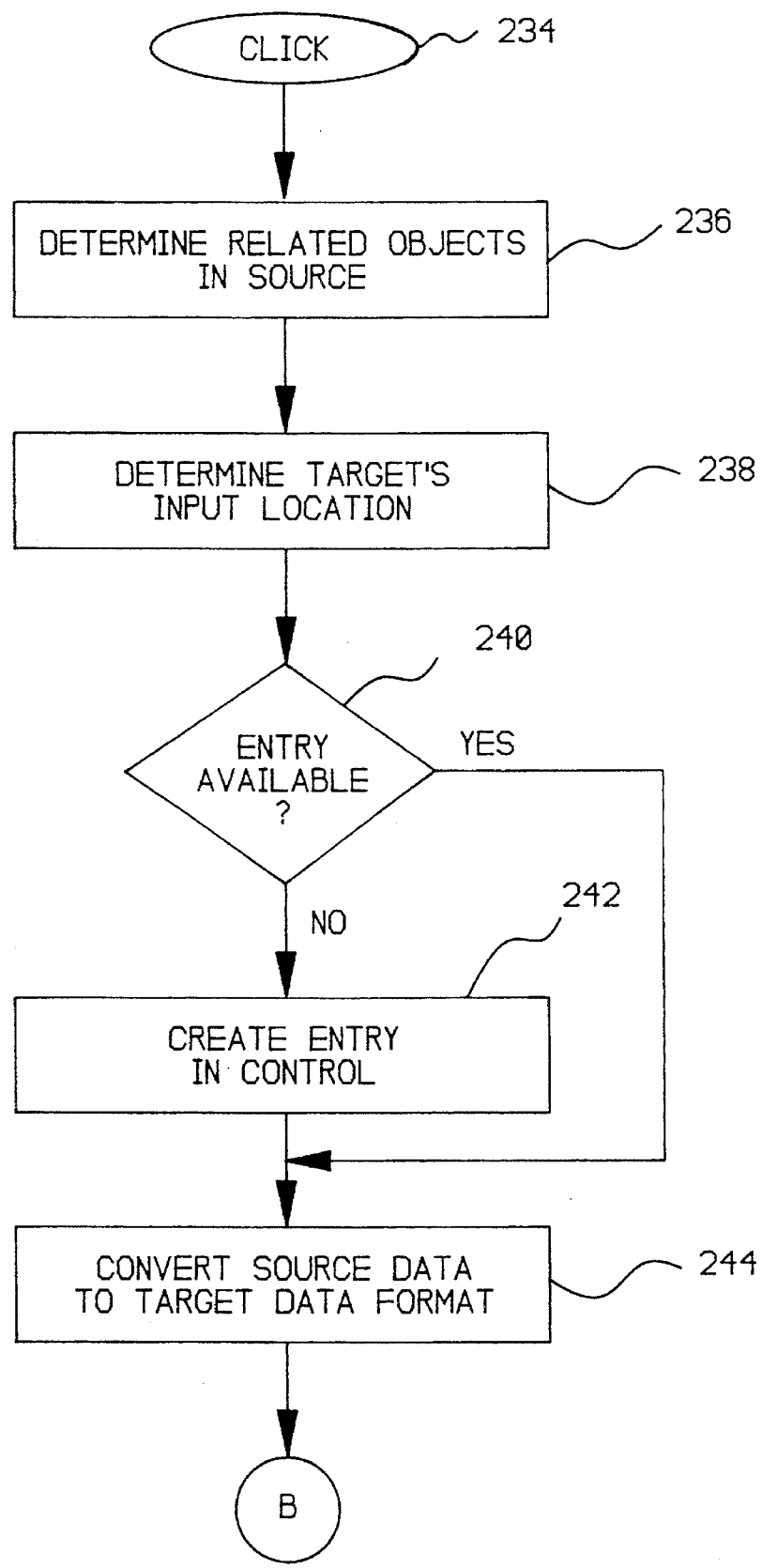
FIGS. 13a and 13b is a flowchart representation of the "click" routine of FIG. 11.
Figure 13B:
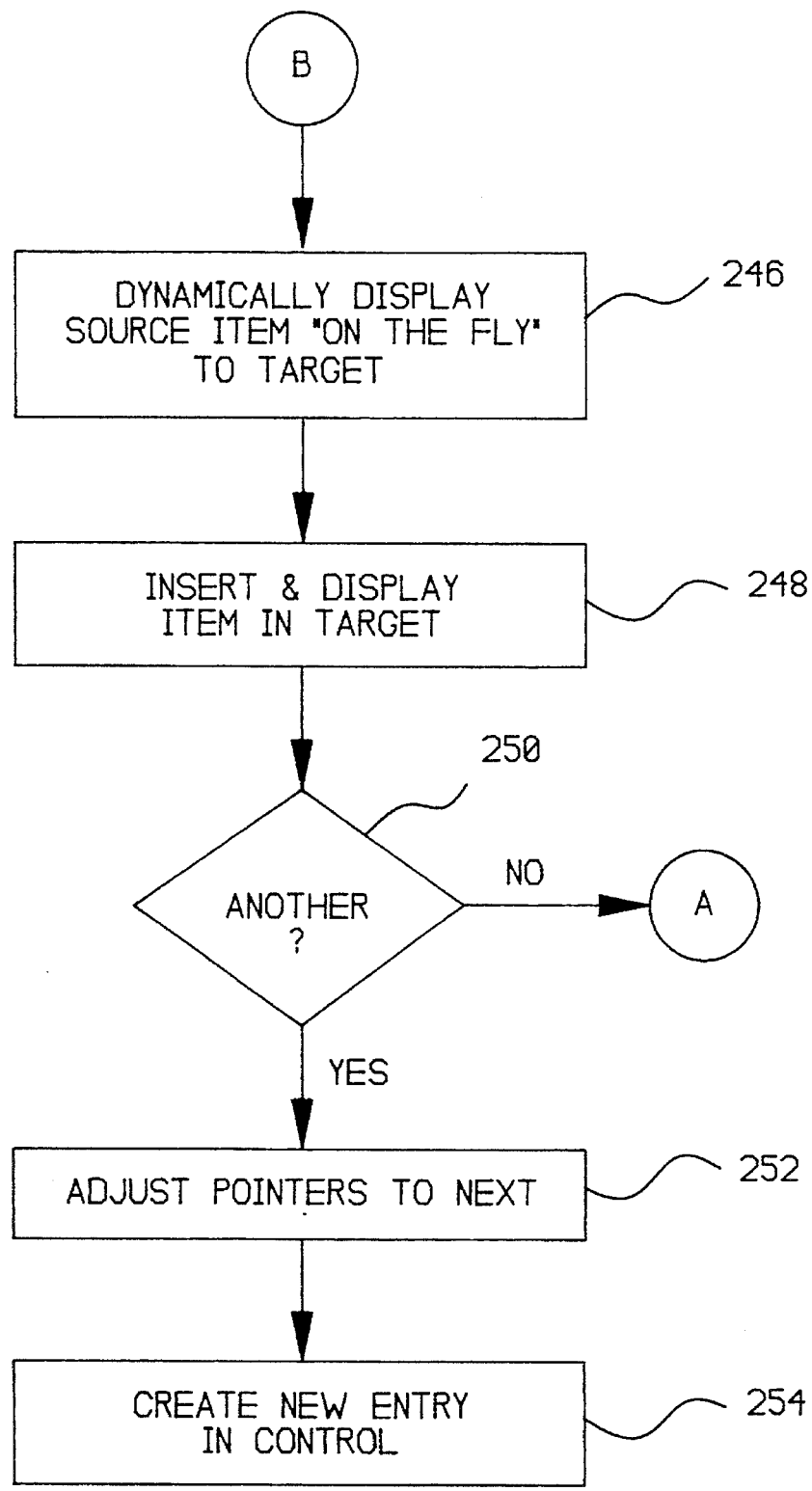

FIGS. 13a and b depict in flowchart form the "click" routine. The routine commences as software block 234. In accordance with software block 236, data processing system 10 determines which software objects within the source software object have been selected by the operator for inclusion in the target software object. For each item selected by the operator, data processing system 10 determines an input location for each item within the target software object. In accordance with software block 240, data processing system 10 determines whether entry of the items is possible. If not, in accordance with software block 242, data processing system 10 creates an entry in the control module for the target software object. In either event, data processing system 10 converts the items from the source software object to a format which is compatible with the target software object, in accordance with software block 244. Next, in accordance with software block 246, data processing system 10 automatically displays a dynamic representation of the copying of items to the target software object. In the preferred embodiment of the present invention, this dynamic representation is that of an accelerated drag-and-drop operation. In accordance with software block 248, data processing system 10 then inserts and displays the selected items in the target software object. In accordance with software block 250, the process continues until the operator closes the accelerated integration operation, preferably through use of pull-down menu 42. For each additional item selected by the operator, data processing system 10 adjusts the pointer in accordance with software block 252, and creates a new entry in the control, in accordance with software block 254.

Figure 14:
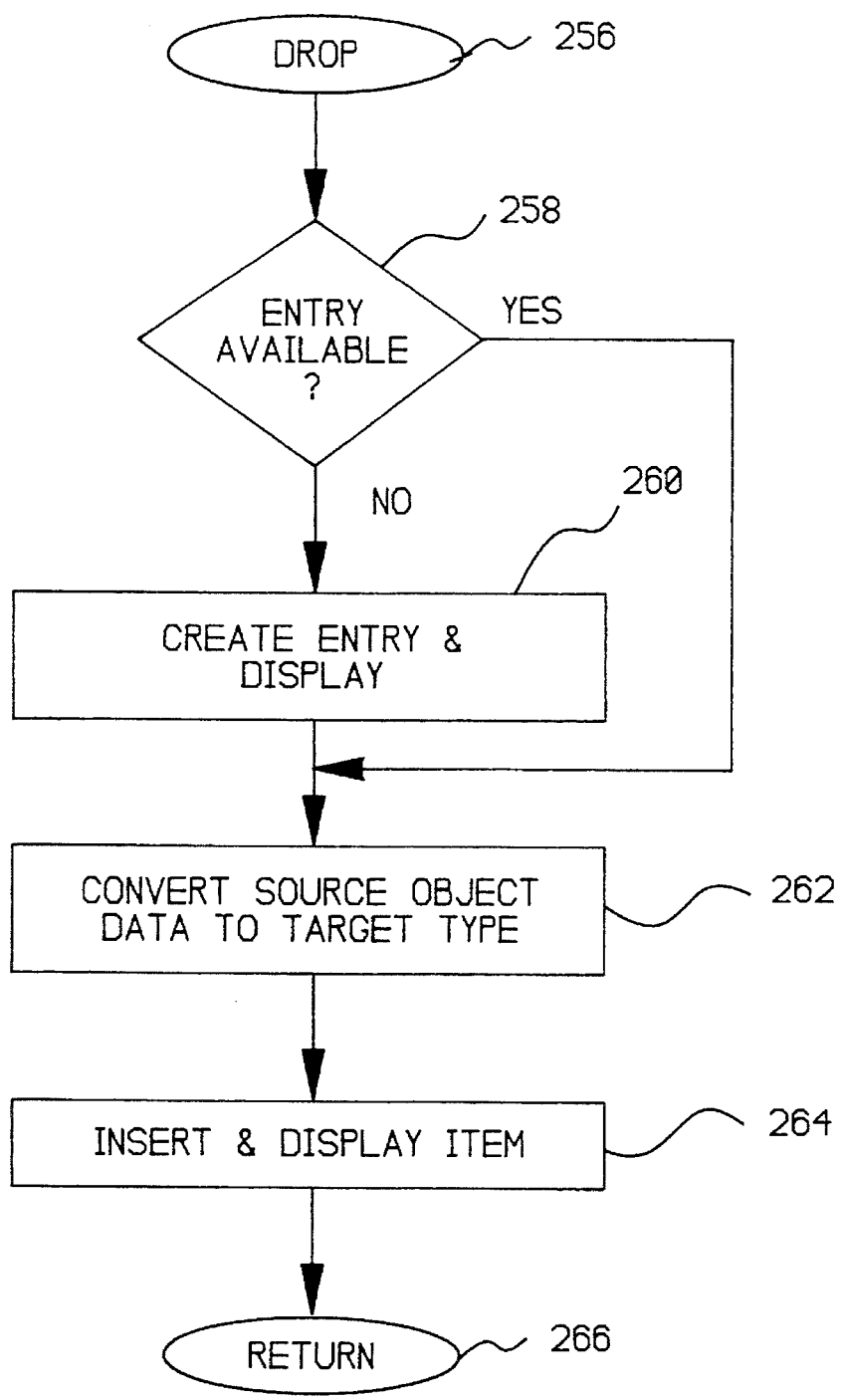
FIG. 14 is a flowchart representation of the "drop" routine of FIG. 11.

FIG. 14 is a flowchart representation of the "drop" routine, which commences at software block 256. In accordance with software block 258, data processing system 10 determines whether entry of the items in the target software object is possible. If not, the process continues at software block 260, wherein data processing system 10 creates an entry and displays the entry. In either event, the process continues at software block 262, wherein data processing system 10 converts the source object data to a type of data which is compatible with the target type. Then, in accordance with software block 264, data processing system 10 inserts the data item within the target software object, and displays the item. In the examples provided above, this display may be a combination of a plurality of data fields and any associated iconographic representation of the data field.

Finally, in accordance with software block 266, the process returns to software block 216 of FIG. 11.

While the invention has been particularly shown and described with reference to a preferred embodiment, it will be understood by those skilled in the art that various changes in form and detail may be made therein without departing from the spirit and scope of the invention.

We claim:

1. In a data processing system graphical user interface which simultaneously displays a plurality of software objects, a method of facilitating operator integration of items between software objects, comprising the data processing implemented steps of:

allowing operator selection of a source software object and a target software object within said data processing system;

recording said operator selection; thereafter monitoring operator input from a graphical pointing device for selection of items present in said source software object; and automatically copying items selected by said operator to said target software object, while said graphical pointing device is maintained within said source software object.

2. A method according to claim 1, further comprising:

automatically providing a visual indication within said data processing system which is representative of said step of automatically copying.

3. A method according to claim 2, wherein said visual indication which is provided during said step of automatically providing, comprises a simulation of a drag-and-drop direct icon manipulation operation.

4. A method according to claim 3, wherein said simulation of a drag-and-drop direct icon manipulation operation is displayed at an accelerated pace.

5. A method according to claim 2:

wherein said items include at least one iconographic representation for each item; and wherein, during said step of automatically copying, said at least one iconographic representation is copied to said target object.

6. A method according to claim 5, further comprising:

during said step of automatically providing a visual indication representative of said step of automatically copying, a simulation of a drag-and-drop direct icon manipulation operation is provided which involves said at least one iconographic representation.

7. A method according to claim 1, further comprising:

providing a visual indication of operator selection of said source software object and said target software object.

8. A method according to claim 1, further comprising:

subsequent to operator selection of said source software object and said target software object, modifying a cursor associated with said graphical pointing device to indicate to said operator that subsequent use of said graphical pointing device will perform said steps of (a) automatically copying, and (b) automatically providing a visual indication of said step of automatically copying.

9. A method according to claim 1:

wherein said items include a plurality of data fields; and wherein, during said step of automatically copying, said plurality of data fields are copied to said target object.

10. In a data processing system graphical user interface which simultaneously displays a plurality of software objects, a method of facilitating operator integration of items between software objects, comprising the comprising the data processing implemented steps of:

allowing operator selection of a source software object and a target software object within said data processing system;

recording said operator selection; thereafter monitoring operator input from a graphical pointing device for selection of items present in said source software object;

automatically copying items selected by said operator to said target software object, while said graphical pointing device is maintained within said source software object; and automatically providing a visual indication within said data processing system which is representative of said step of automatically copying.

11. A method according to claim 10, further comprising:

providing a visual indication of operator selection of said source software object and said target software object.

12. A method according to claim 10, further comprising:

subsequent to operator selection of said source software object and said target software object, modifying a cursor associated with said graphical pointing device to indicate to said operator that subsequent use of said graphical pointing device will perform said steps of (a) automatically copying, and (b) automatically providing a visual indication of said step of automatically copying.

13. A method according to claim 10, wherein said visual indication provided during said step of automatically providing comprises a simulation of a drag-and-drop direct icon manipulation operation.

14. A method according to claim 13, wherein said simulation of a drag-and-drop direct icon manipulation operation is displayed at an accelerated pace.

15. A method according to claim 10:

wherein said items include a plurality of data fields; and wherein, during said step of automatically copying, said plurality of data fields are copied to said target object.

16. A method according to claim 10:

wherein said items include at least one iconographic representation for each item; and wherein, during said step of automatically copying, said at least one iconographic representation is copied to said target object.

17. A method according to claim 16, further comprising:

during said step of automatically providing a visual indication representative of said step of automatically copying, a simulation of a drag-and-drop direct icon manipulation operation is provided which involves said at least one iconographic representation.

18. A method in a graphical user interface of a data processing system of facilitating operator initiated integration of items between software objects, comprising the method steps of:

providing a visual representation in said graphical user interface of an accelerated integration mode of operation;

monitoring operator input for selection of said visual representation of said accelerated integration mode of operation and enabling said accelerated integration mode of operation in response to said operator input;

during said accelerated integration mode of operation, monitoring operator input for selection of a source object and at least one target object;

during said accelerated integrated mode of operation, monitoring operator input from a graphical pointing device for selection of items present in said source object, thereafter automatically:

(a) copying said items to said at least one target object; and
(b) providing a dynamic representation in said graphical user interface of each step of copying;

while said graphical pointing device is maintained within said source object;

monitoring operator input for selection of deactivation of said accelerated integration mode of operation and deactivating said accelerated integration mode of operation in response to said operator input.

19. A method according to claim 18, further comprising:
providing a visual indication of operator selection of said source object and said target object.

20. A method according to claim 18, further comprising:
upon enabling said accelerated integration mode of operation, modifying a cursor associated with said graphical pointing device to indicate to said operator that subsequent use of said graphical pointing device will perform said steps of (a) copying, and (b) providing dynamic representation.

21. A method according to claim 18, wherein said visual indication provided during said step of providing a dynamic representation comprises a simulation of a drag-and-drop direct icon manipulation operation.

22. A method according to claim 21, wherein said simulation of a drag-and-drop direct icon manipulation operation is displayed at an accelerated pace.

23. A method according to claim 18:
wherein said items include a plurality of data fields; and
wherein, during said step of copying, said plurality of data fields are copied to said target object.

24. A method according to claim 18:
wherein said items include at least one iconographic representation for each item; and
wherein, during said step of copying, said at least one iconographic representation is copied to said target object.

25. A method according to claim 24, further comprising:
during said step of providing a dynamic representation, a simulation of a drag-and-drop direct icon manipulation operation is provided which involves said at least one iconographic representation.

26. A data processing system which simultaneously displays a plurality of software objects, and facilitates operator integration of items between software objects, comprising:
means for allowing operator selection of a source software object and a target software object;
means for recording said operator selection;
means for monitoring operator input from a graphical pointing device for selection of items present in said source software object;
means for automatically copying items selected by said operator to said target object, while said graphical pointing device is maintained within said source software object; and
means for automatically providing a visual indication representative of said automatic copying.

27. A data processing system according to claim 26, further comprising:
means for providing a visual indication of operator selection of said source software object and said target software object.

28. A data processing system according to claim 26, further comprising:
means for modifying a cursor associated with said graphical pointing device subsequent to operator selection of said source software object and said target software object to indicate to said operator that subsequent use of said graphical pointing device will actuate (a) said means for automatically copying, and (b) said means for automatically providing a visual indication.

29. A data processing system according to claim 26, wherein said visual indication provided comprises a simulation of a drag-and-drop direct icon manipulation operation.

30. A data processing system according to claim 29, wherein said simulation of a drag-and-drop direct icon manipulation operation is displayed at an accelerated pace.

31. A data processing system according to claim 26:
wherein said items include a plurality of data fields; and
wherein, during said automatic copying, said plurality of data fields are copied to said target object.

32. A data processing system according to claim 26:
wherein said items include at least one iconographic representation for each item; and
wherein, during said automatic copying, said at least one iconographic representation is copied to said target object.

33. A data processing system according to claim 32, further comprising:
during said automatic providing of a visual indication representative of said automatic copying, a simulation of a drag-and-drop direct icon manipulation operation is provided which involves said at least one iconographic representation.

* * * * *